Figure 1:
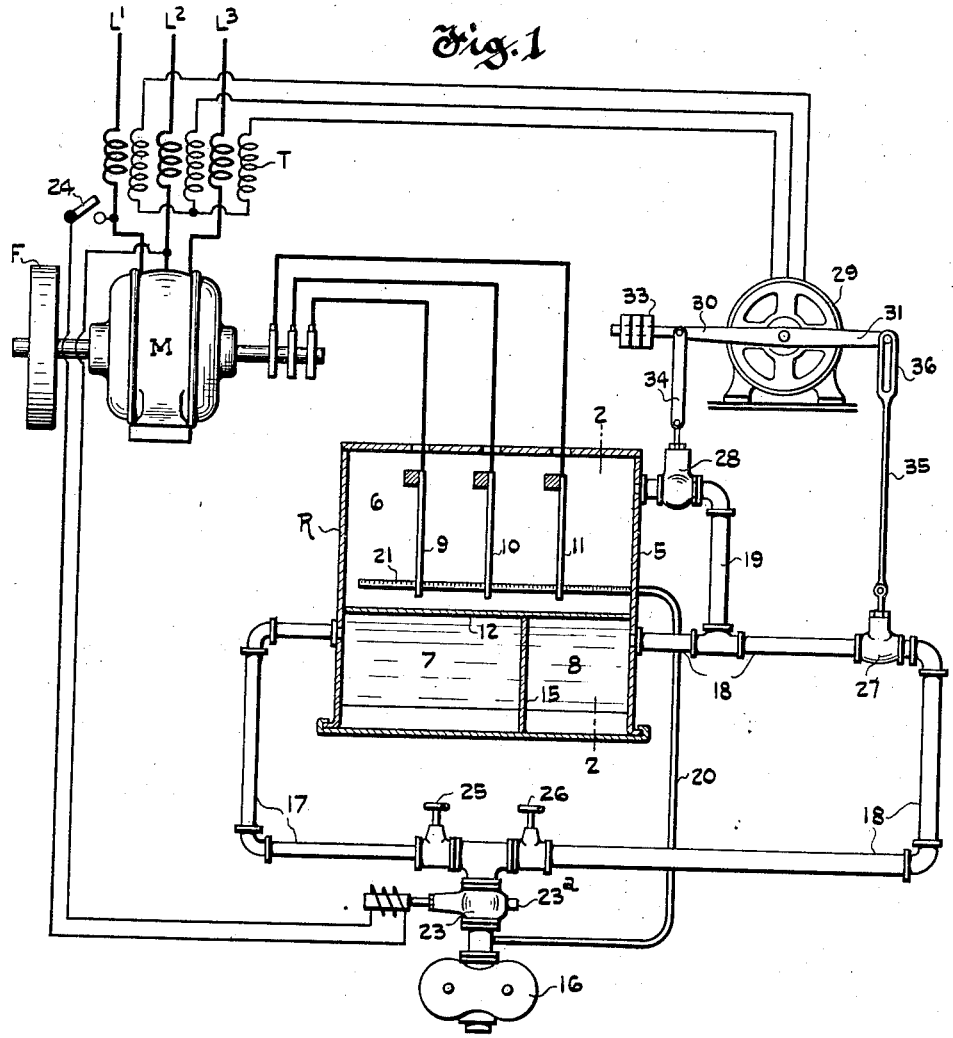

May 6, 1930.  E. W. SEEGER  1,757,339
MOTOR CONTROLLER
Filed Sept. 17, 1928

INVENTOR
Edwin W. Seeger
BY
ATTORNEY

Patented May 6, 1930

1,757,339

UNITED STATES PATENT OFFICE

EDWIN W. SEEGER, OF WAUWATOSA, WISCONSIN, ASSIGNOR, BY MESNE ASSIGNMENTS, TO CUTLER-HAMMER, INC., OF MILWAUKEE, WISCONSIN, A CORPORATION OF DELAWARE

MOTOR CONTROLLER

Application filed September 17, 1928. Serial No. 306,374.

This invention relates to motor controllers, and more particularly to liquid rheostats for effecting starting and slip regulation of induction motors.

Liquid rheostats are commonly used to control induction motors in installations such as rolling mills wherein a flywheel is associated with the motor to effect equalization of the current taken from the supply circuit under varying load conditions. As is well known, it is necessary in such installations to effect slow exclusion of the resistance in the secondary circuit of the motor during starting to prevent overloading of the motor and the supply circuit. However, during running it is necessary to effect slip regulation by quick variation of the resistance in the secondary circuit of the motor so as to cause the flywheel to effect equalization of the current taken by the motor under varying load conditions.

The present invention has among its objects to provide an improved rheostat for effecting the required control of induction motors in systems of the aforesaid character.

Another object is to provide an improved liquid rheostat for systems of the aforementioned character wherein the level of the electrolyte is directly controlled by air under pressure to produce the required control effects.

Another object is to provide a liquid rheostat of the aforesaid character having improved means associated therewith for controlling the level of the electrolyte for starting and for slip regulation.

Various other objects and advantages of the invention will hereinafter appear.

The accompanying drawing illustrates an embodiment of the invention which will now be described, it being understood that various modifications may be made in the embodiment illustrated without departing from the spirit and scope of the appended claims.

Figure 2:
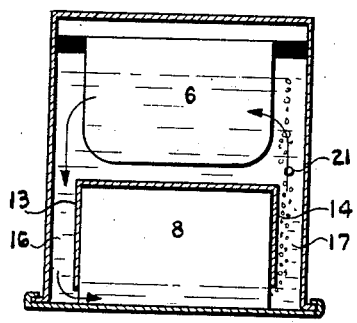

In the drawing:

Figure 1 illustrates a control system employing a liquid rheostat embodying the invention, and Fig. 2 is a sectional view of the liquid rheostat taken on line 2—2 of Figure 1.

Referring to Fig. 1, the same illustrates a slip ring type, three-phase induction motor M having a supply circuit indicated by lines $L^1$, $L^2$, $L^3$. It is assumed that said motor drives a rolling mill or other variable load and as is the usual practice the same is provided with a flywheel F and is controlled by a liquid rheostat R connected in the secondary circuit thereof.

The liquid rheostat R is provided with a tank 5 having an upper chamber 6 and a pair of displacement chambers 7 and 8 located below said former chamber and in communication therewith. The upper chamber 6 contains electrodes 9, 10 and 11, each of which is connected to one of the slip rings of motor M and the level of the electrolyte within said chamber is controlled by air under pressure in the chambers 7 and 8. The chambers 7 and 8 are formed by a horizontal wall 12, vertical side walls 13 and 14 and a separating wall 15 extending between said side walls and abutting the horizontal wall 12. As shown in Fig. 2 the side walls 13 and 14 are spaced with respect to the side walls and bottom wall of tank 5 to provide passage ways 16 and 17 between the displacement chambers 7 and 8 and upper chamber 6.

Compressed air from a continuously acting blower 16 or other suitable source is supplied to chamber 7 through a pipe line 17 and to chamber 8 by a pipe line 18 and the air in chamber 8 can be by-passed through a pipe line 19 into chamber 6. An additional pipe 20 supplies air from the blower 16 to a bubbler 21 located immediately above passage 17 for a purpose hereinafter set forth.

An electromagnetically operated valve 23 is provided between the blower 16 and pipe lines 17 and 18. Said valve is controlled by a master switch 24 and when energized connects the blower 16 to pipe lines 17 and 18 and when deenergized disconnects said blower from said pipe lines and permits the air to escape from said pipe lines through an exhaust passage 23ª. The rate at which the air is admitted to pipe lines 17 and 18 is controlled by valves 25 and 26, respectively, and for purposes hereinafter set forth pipe line 18 is provided with an additional valve 27, while the pipe line 19 is provided with a valve 28.

Valves 27 and 28 are both operated by a torque motor 29 which is supplied with current from lines $L^1$, $L^2$, $L^3$ by a three phase current transformer T connected between motor M and said supply lines. The shaft of the torque motor 29 has oppositely projecting arms 30 and 31 which are biased to move in a counter-clockwise direction under the action of adjustable weights 33. Arm 30 is connected to the valve 28 by a link 34 while valve 27 is provided with an operating link 35 which is connected to arm 31 through a medium of lost motion connection 36. Valves 27 and 28 are both biased towards closed position and valve 28 may be of the well known piston type and is designed so that the same remains closed until after a given upward movement of its operating member from the normal position shown in Fig. 1. The weights 33 act to normally hold valve 27 in open position and valve 28 in closed position and under given current conditions the torque motor 29 responds against the action of said weights to first close valve 27 and then open valve 28, the degree of opening of the latter valve being determined by the degree of operation of said motor.

The operation of the aforedescribed control system will now be more fully described. Closure of master switch 24 connects the operating winding of valve 23 across lines $L^1$, $L^2$ and said valve in opening permits air to pass from blower 16 through valves 25 and 26 to pipe lines 17 and 18. Pipe line 17 supplies air to chamber 7 at a rate determined by the setting of valve 25 and since valve 27 is normally open and valve 28 is normally closed air is supplied to chamber 8 through pipe line 18 at a rate determined by the setting of valve 26.

Admission of air to chambers 7 and 8 forces the electrolyte therein through passages 16 and 17 into the chamber 6, and as the level of the electrolyte in the latter chamber rises the immersion of electrodes 9, 10 and 11 is increased to reduce the resistance in the secondary circuit of the motor. Valve 25 is adjusted to effect displacement of the electrolyte in chamber 7 at a relatively slow rate while valve 26 is adjusted to effect rapid displacement of the electrolyte in chamber 8. As the level of the electrolyte in chamber 6 rises the current supplied to motor M from lines $L^1$, $L^2$, $L^3$ increases and ultimately transformer T supplies motor 29 with sufficient current to effect operation thereof. Initial operation of motor 29 effects closure of valve 27 and thereafter valve 28 is opened to a degree dependent upon the degree of operation of said motor. Closure of valve 27 prevents further displacement of the electrolyte in chamber 8 and if valve 28 is opened the air in said chamber is permitted to escape through bypass pipe 19 into chamber 6 at a rate determined by the degree of opening of said latter valve. This causes the electrolyte in chamber 6 to remain stationary or to drop, as the case may be, and the resistance in the secondary circuit of motor M is increased to effect a decrease in the current taken by said motor from the supply circuit. When the current taken by motor M from the supply circuit drops to a given value torque motor 29 returns to normal position to reopen valve 27 and reclose valve 28. The aforedescribed action of the torque motor 29 is repeated until the motor is ultimately brought up to speed by displacement of all of the electrolyte in chambers 7 and 8.

When motor M is brought up to speed torque motor 29 acts to effect slip regulation thereof. Under overload conditions said torque motor operates to effect opening of valve 28 and closure of valve 27, which as before stated causes the level of the electrolyte in chamber 6 to drop. The resistance in the secondary circuit of motor M is thus increased to increase the slip of the motor, whereby the flywheel F acts in a well known manner to give up part of its energy to augment the driving effect of motor M. It is desirable that the slip of the motor be regulated by quick variation of the level of the electrolyte in chamber 6 and for this purpose the pipe lines 18 and 19 associated with chamber 8 are designed to provide for rapid supply and escape of the air from said chamber.

Opening of master switch 24 deenergizes the solenoid of valve 23 and said valve when deenergized disconnects the pipe lines 17 and 18 from the blower 16 and permits the air within chambers 7 and 8 to exhaust through said pipe lines and the exhaust passage 23 of said valve.

As before stated, the blower 16 is connected through a pipe 20 to a bubbler 21, which is located immediately above the passage 17. The air discharged from bubbler 21 passes upwardly through the electrolyte in chamber 6 and causes circulation of the electrolyte upwardly through the passage 17 and downwardly through the passage 16 as indicated by arrows. It should also be noted in connection with Fig. 2 that the lower edge of the wall 14 is spaced a greater distance from the bottom of tank 5 than is the lower edge of the wall 13. Thus when all the electrolyte is expelled from displacement chambers 7 and 8 the air supplied to said chambers discharges under the lower edge of wall 14 and upwardly through the passage 17 into chamber 6. Such discharge of air acts to assist the bubbler 21 in effecting circulation of the electrolyte in the direction above described.

What I claim as new and desire to secure by Letters Patent is:

1. The combination with an induction motor and a fluid rheostat for controlling the secondary circuit thereof, of pneumatic means for raising the level of the electrolyte of said rheostat at a relatively slow rate for starting of said motor, and pneumatic means adapted to act independently of said former means to effect relatively quick variations of the level of the electrolyte of said rheostat for slip regulation of said motor.

2. The combination with an induction motor and a fluid rheostat for controlling the secondary circuit thereof, of pneumatic means for raising the level of the electrolyte of said rheostat at a relatively slow rate for starting of said motor, pneumatic means adapted to act independently of said former means to effect relatively quick variations of the level of the electrolyte of said rheostat for slip regulation of said motor, and means responsive to the load on said motor to vary the rate at which the level of the electrolyte is varied by said last mentioned pneumatic means.

3. In a fluid rheostat, the combination with an electrolyte tank having a plurality of displacement chambers in communication therewith, of a plurality of electrodes within said tank and means for supplying compressed air to said chambers to expel the electrolyte therefrom for immersion of said electrodes, said means providing for admission of air to one of said chambers at a given rate and to the other of said chambers at an increased rate.

4. In a fluid rheostat, the combination with an electrolyte tank having a plurality of displacement chambers in communication therewith, of a plurality of electrodes within said tank, means for supplying compressed air to one of said displacement chambers at a given minimum rate and to the other of said chambers at an increased rate, and means providing for escape of the air supplied to said latter chamber at a variable rate.

5. In a fluid rheostat, the combination with an electrolyte tank having an electrode containing chamber and a plurality of electrolyte displacement chambers in communication therewith, of means for supplying air under pressure to one of said displacement chambers at a given minimum rate and to another of said displacement chambers at an increased rate, and means for interrupting the supply of air to said latter displacement chamber and for permitting escape of the air therein while maintaining the supply of air to said former displacement chamber.

6. In a fluid rheostat, the combination with an electrolyte tank having an electrode containing chamber and a pair of electrolyte displacement chambers arranged below said former chamber and in communication therewith, of means for simultaneously admitting compressed air to both of said chambers, means for interrupting the supply of air to one of said displacement chambers while maintaining the supply of air to the other of said chambers, and means providing for escape of the air within said former displacement chamber at a variable rate.

7. In a motor control system, a motor, a flywheel associated therewith, a variable resistance in the circuit of said motor comprising a liquid rheostat having an electrode containing chamber and a pair of electrolyte displacement chambers arranged below said former chamber and in communication therewith, of means for simultaneously supplying air under pressure to both of said chambers, and means responsive to the load on said motor for controlling the air supplied to one of said chambers to effect slip regulation of said motor.

8. The combination with an induction motor, of a liquid rheostat connected in the secondary circuit thereof, said rheostat including a tank having an electrode containing chamber and a pair of electrolyte displacement chambers in communication therewith, of means for supplying air at a given rate to one of said chambers during starting of the motor, means for supplying air to the other of said chambers at an increased rate to expel all of the electrolyte therefrom during starting of the motor, and means responsive to load conditions in the motor circuit to permit escape of the air in said latter displacement chamber for slip regulation of said motor.

In witness whereof, I have hereunto subscribed my name.

EDWIN W. SEEGER.